United States Patent
Hanchi et al.

(10) Patent No.: US 8,837,075 B2
(45) Date of Patent: *Sep. 16, 2014

(54) HEAD ASSEMBLY WITH HEAD-MEDIA SPACING CONTROL

(71) Applicant: Seagate Technology LLC, Cupertino, CA (US)

(72) Inventors: Jorge Vicente Hanchi, St. Louis Park, MN (US); Dian Song, Eden Prairie, MN (US); John Stuart Wright, Edina, MN (US); Andrew D. White, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,829

(22) Filed: Oct. 29, 2012

(65) Prior Publication Data

US 2013/0063834 A1    Mar. 14, 2013

Related U.S. Application Data

(63) Continuation of application No. 12/491,605, filed on Jun. 25, 2009, now Pat. No. 8,310,779, which is a continuation-in-part of application No. 11/115,659, filed on Apr. 27, 2005, now Pat. No. 7,564,649.

(51) Int. Cl.
  *G11B 21/21*    (2006.01)
  *G11B 21/02*    (2006.01)

(52) U.S. Cl.
  USPC ............................ 360/75; 360/294.7; 360/128

(58) Field of Classification Search
  CPC ..... G11B 5/6005; G11B 21/21; G11B 5/6011; G11B 5/60; G11B 5/6058
  USPC .................................. 360/75, 31, 294.7, 128
  See application file for complete search history.

(56) References Cited

U.S. PATENT DOCUMENTS 5,455,730 A * 10/1995 Dovek et al. .................. 360/317
5,488,857 A    2/1996 Homma et al.

(Continued)

FOREIGN PATENT DOCUMENTS

EP    739007 A2    10/1996
JP    62217477     9/1987

(Continued)

OTHER PUBLICATIONS

English machine translation of Yamamoto et al. (JP 05-020635 A), dated Jan. 29, 1993.*

(Continued)

*Primary Examiner* — Will J Klimowicz
(74) *Attorney, Agent, or Firm* — Westman, Champlin & Koehler, P.A.

(57) ABSTRACT

A head assembly including one or more transducer elements for controlling head-media spacing is disclosed. The assembly includes detection circuitry configured to receive an input detection signal responsive to the spacing between the head and the data storage media and provide an output measure indicative of the head-media spacing. The output signal is utilized by control circuitry to provide a control input to one of a plurality of transducer elements on the head to protrude a localized portion of the head to adjust head-media spacing.

18 Claims, 16 Drawing Sheets

(56) References Cited

U.S. PATENT DOCUMENTS

| | | | |
|---|---|---|---|
| 5,527,110 A * | 6/1996 | Abraham et al. | 374/5 |
| 5,581,021 A | 12/1996 | Flechsig et al. | |
| 5,777,815 A * | 7/1998 | Kasiraj et al. | 360/75 |
| 5,942,680 A | 8/1999 | Boutaghou | |
| 5,991,113 A | 11/1999 | Meyer et al. | |
| 6,008,640 A | 12/1999 | Tan et al. | |
| 6,046,871 A | 4/2000 | Schaenzer et al. | |
| 6,195,219 B1 * | 2/2001 | Smith | 360/66 |
| 6,196,062 B1 | 3/2001 | Wright et al. | |
| 6,557,399 B1 | 5/2003 | Ku et al. | |
| 6,600,619 B1 | 7/2003 | Morris et al. | |
| 6,611,399 B1 | 8/2003 | Mei et al. | |
| 6,614,627 B1 | 9/2003 | Shimizu et al. | |
| 6,757,140 B1 | 6/2004 | Hawwa | |
| 6,760,181 B2 | 7/2004 | Li et al. | |
| 6,967,805 B1 | 11/2005 | Hanchi et al. | |
| 7,068,468 B2 | 6/2006 | Kamijima | |
| 7,209,309 B2 | 4/2007 | Kurita et al. | |
| 7,375,930 B2 | 5/2008 | Yang et al. | |
| 7,667,932 B2 | 2/2010 | Kwon et al. | |
| 7,808,746 B2 | 10/2010 | Burbank et al. | |
| 8,310,779 B2 * | 11/2012 | Hanchi et al. | 360/75 |
| 2002/0040594 A1 | 4/2002 | Matsui et al. | |
| 2002/0054447 A1 | 5/2002 | Kurita et al. | |
| 2002/0097517 A1 * | 7/2002 | Bonin et al. | 360/75 |
| 2002/0105750 A1 | 8/2002 | Li et al. | |
| 2002/0191342 A1 | 12/2002 | Yanagisawa | |
| 2003/0011914 A1 | 1/2003 | Angelo et al. | |
| 2003/0043491 A1 | 3/2003 | Riddering et al. | |
| 2003/0043497 A1 | 3/2003 | Riddering et al. | |
| 2004/0233583 A1 | 11/2004 | Yanagisawa | |
| 2004/0240099 A1 | 12/2004 | Brannon et al. | |
| 2005/0013057 A1 | 1/2005 | Kurita et al. | |
| 2005/0046988 A1 * | 3/2005 | Suk | 360/59 |
| 2005/0201001 A1 | 9/2005 | Conteras et al. | |
| 2005/0243473 A1 | 11/2005 | Hu et al. | |
| 2005/0254171 A1 | 11/2005 | Ota et al. | |
| 2005/0264912 A1 | 12/2005 | Nikitin et al. | |
| 2006/0098346 A1 | 5/2006 | Kwon et al. | |
| 2006/0146432 A1 | 7/2006 | Khurshudov et al. | |
| 2006/0245110 A1 | 11/2006 | Hanchi et al. | |
| 2009/0262460 A1 | 10/2009 | Hanchi et al. | |
| 2009/0268345 A1 | 10/2009 | Koganezawa | |
| 2012/0268841 A1 | 10/2012 | Hong et al. | |

FOREIGN PATENT DOCUMENTS

| | | | |
|---|---|---|---|
| JP | 63268173 A * | 11/1988 | |
| JP | 01091384 | 4/1989 | |
| JP | 01171172 A | 7/1989 | |
| JP | 02226047 A * | 9/1990 | |
| JP | 02226047 A | 9/1990 | |
| JP | 03040277 A | 2/1991 | |
| JP | 03173981 A | 7/1991 | |
| JP | 03176805 A * | 7/1991 | |
| JP | 03214480 A | 9/1991 | |
| JP | 04137214 A * | 5/1992 | |
| JP | 04176066 A | 6/1992 | |
| JP | 04221401 A | 8/1992 | |
| JP | 4265585 | 9/1992 | |
| JP | 05020635 A * | 1/1993 | |
| JP | 07235157 A * | 9/1995 | |
| JP | 07296379 A | 11/1995 | |
| JP | 07326049 A * | 12/1995 | |
| JP | 09007148 A | 1/1997 | |
| JP | 09044979 A | 2/1997 | |
| JP | 963050 | 3/1997 | |
| JP | 10027342 A | 1/1998 | |
| JP | 10027415 | 1/1998 | |
| JP | 10289401 | 10/1998 | |
| JP | 11339414 A | 12/1999 | |
| JP | 2000348456 A * | 12/2000 | |
| JP | 2002150735 A | 5/2002 | |
| JP | 2002197646 A | 7/2002 | |
| JP | 2003123204 A | 4/2003 | |
| JP | 2003297027 A | 10/2003 | |
| JP | 2003308670 | 10/2003 | |
| WO | WO-2008/152704 A1 | 12/2008 | |

OTHER PUBLICATIONS

English-machine translation of JP 07235157 A to Nakano et al. published on Sep. 5, 1995.*

* cited by examiner

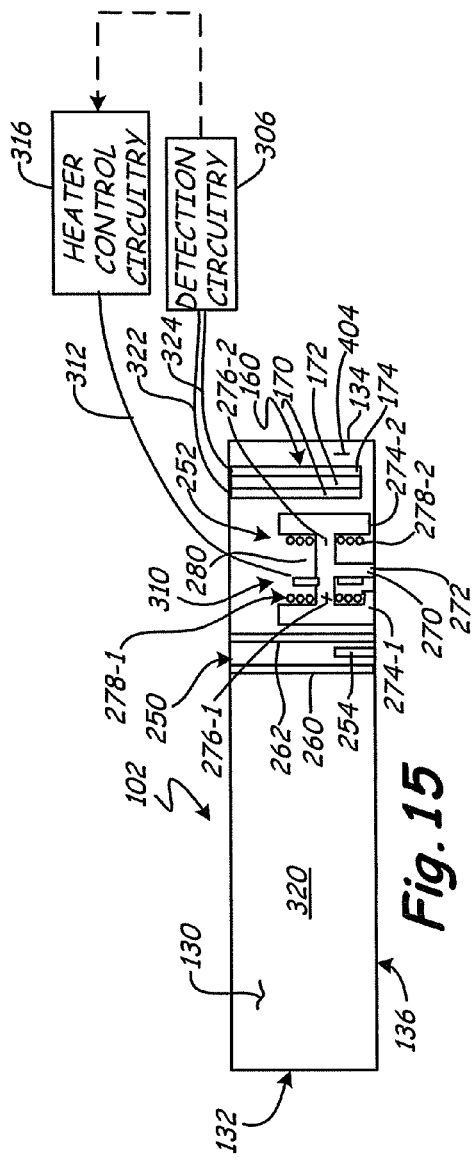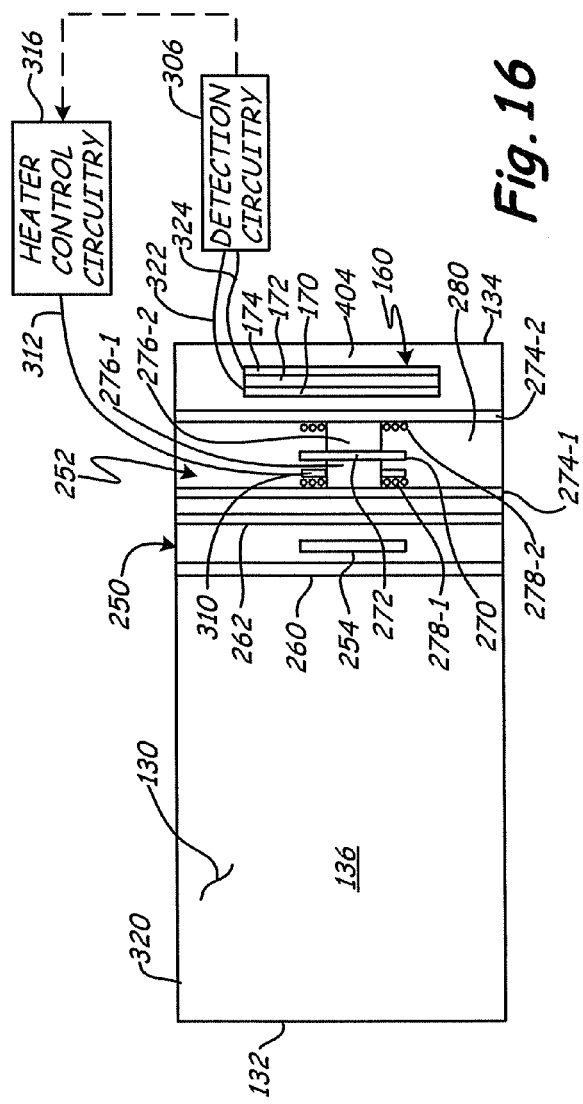

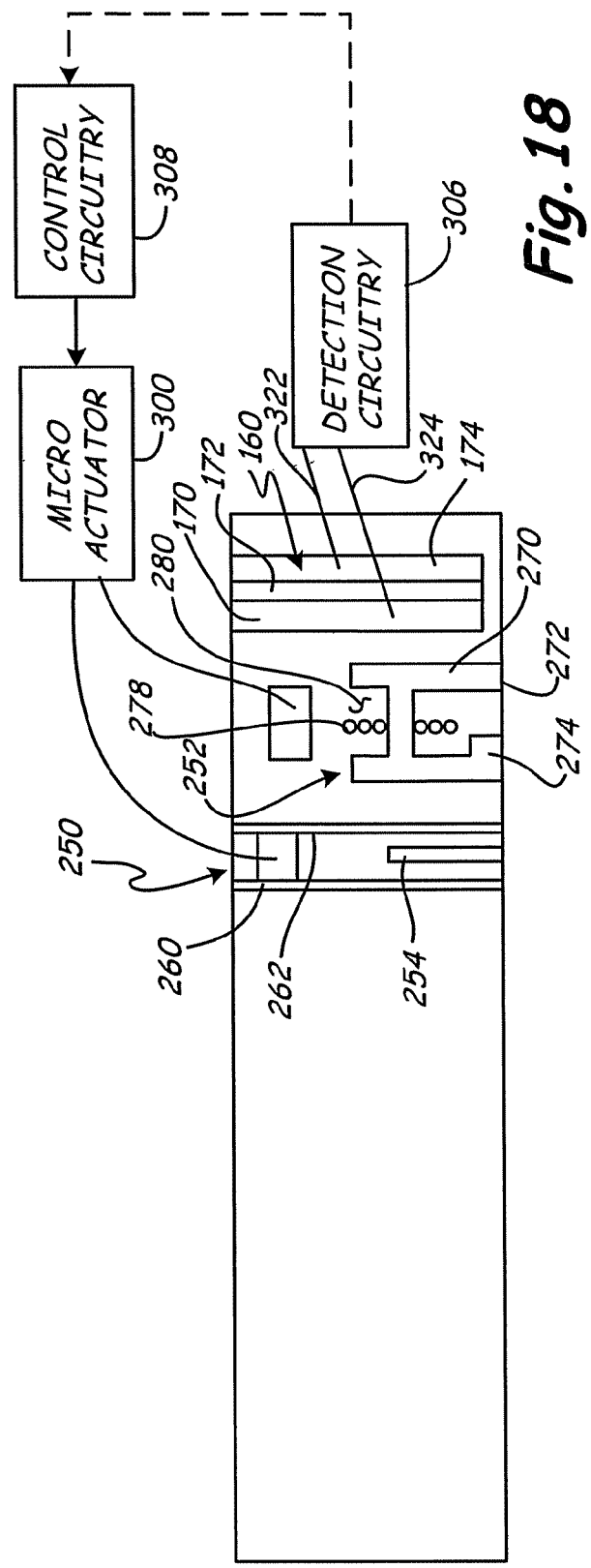

HEAD ASSEMBLY WITH HEAD-MEDIA SPACING CONTROL

CROSS-REFERENCE TO RELATED APPLICATIONS

This application is a continuation of application Ser. No. 12/491,605, filed Jun. 25, 2009, now U.S. Pat. No. 8,310,779, which is a continuation in-part of application Ser. No. 11/115,659 filed Apr. 27, 2005, now U.S. Pat. No. 7,564,649, entitled "HEAD ASSEMBLY HAVING A SENSING ELEMENT TO PROVIDE FEEDBACK FOR HEAD-MEDIA INSTABILITY", the content of which is hereby incorporated by reference in its entirety.

BACKGROUND

Data storage devices store digitally encoded information on a data storage medium, such as a disc. A head is used to read and/or write information to the disc or storage medium. The head includes a transducer element, such as a writer and/or reader, which is fabricated on or coupled to a slider body to read and/or write information to the disc or media.

Typically, the head flies over the disc surface via pressurization of an air bearing surface or surfaces of the slider body. In particular, during operation, rotation of the disc creates an air flow along air bearing surfaces of the slider so that the slider floats above the disc surface for read or write operations. The head is positioned relative to data tracks on the disc surface via a head actuator. The head is coupled to the actuator via a suspension assembly. The suspension assembly includes a load beam, which supplies a load force to the slider body which counteracts the lifting force of the air bearing surface to provide a fly height of the slider body relative to the disc or media surface for read or write operations.

SUMMARY

The present application relates to a head assembly including one or more transducer elements for controlling head-media spacing. In illustrated embodiments, the assembly includes detection circuitry configured to receive an input detection signal responsive to the spacing between the head and the data storage media and provide an output measure indicative of the head-media spacing. The output signal is utilized by control circuitry to provide a control input to one of a plurality of transducer elements on the head to actuate the head to adjust the head-media spacing utilizing the output measure of the head-media spacing from the detection circuitry.

In illustrated embodiments, the transducer elements on the head include a heater element or a piezoelectric element configured to receive the control input from the control circuitry and protrude a localized portion of the head to adjust the head-media spacing. In an illustrated embodiment, the input detection signal is provided by a piezoelectric sensor element or other element on the head that provides an input signal that corresponds to the spacing between the head and the media.

BRIEF DESCRIPTION OF THE DRAWINGS

FIG. 2-1 is a cross-sectional view taken along line 2-1-2-1 of FIG. 2.

FIG. 3-1 is a schematic illustration of a head over a track having a sector of micro-waviness, which excites air bearing resonance modes.

FIG. 4-1 illustrates sensor feedback in a 100-400 kHz frequency range having a micro-waviness instability excitation.

FIG. 4-2 illustrates sensor feedback in the 100-400 kHz frequency range excited by contact with a media surface.

FIG. 7-1 is an enlarged or detailed view of portion 7-1 of FIG. 7.

FIG. 9-1 illustrates an embodiment where the piezoelectric element(s) or sensing element(s) of FIG. 9 are coupled to detection circuitry and microactuation circuitry.

FIG. 15 is a side view of a slider body or head having a sensor element to detect head-media spacing.

FIG. 16 is a view of the slider body or head illustrated in FIG. 15 from an orientation of the air bearing surface of the slider body or head.

FIGS. 17-1 and 17-2 illustrate different end views for different embodiments for the head illustrated in FIG. 15.

FIG. 18 is an illustration of an embodiment of a slider body or head having a sensor element to detect head-media spacing.

DETAILED DESCRIPTION OF ILLUSTRATIVE EMBODIMENTS

Figure 1:
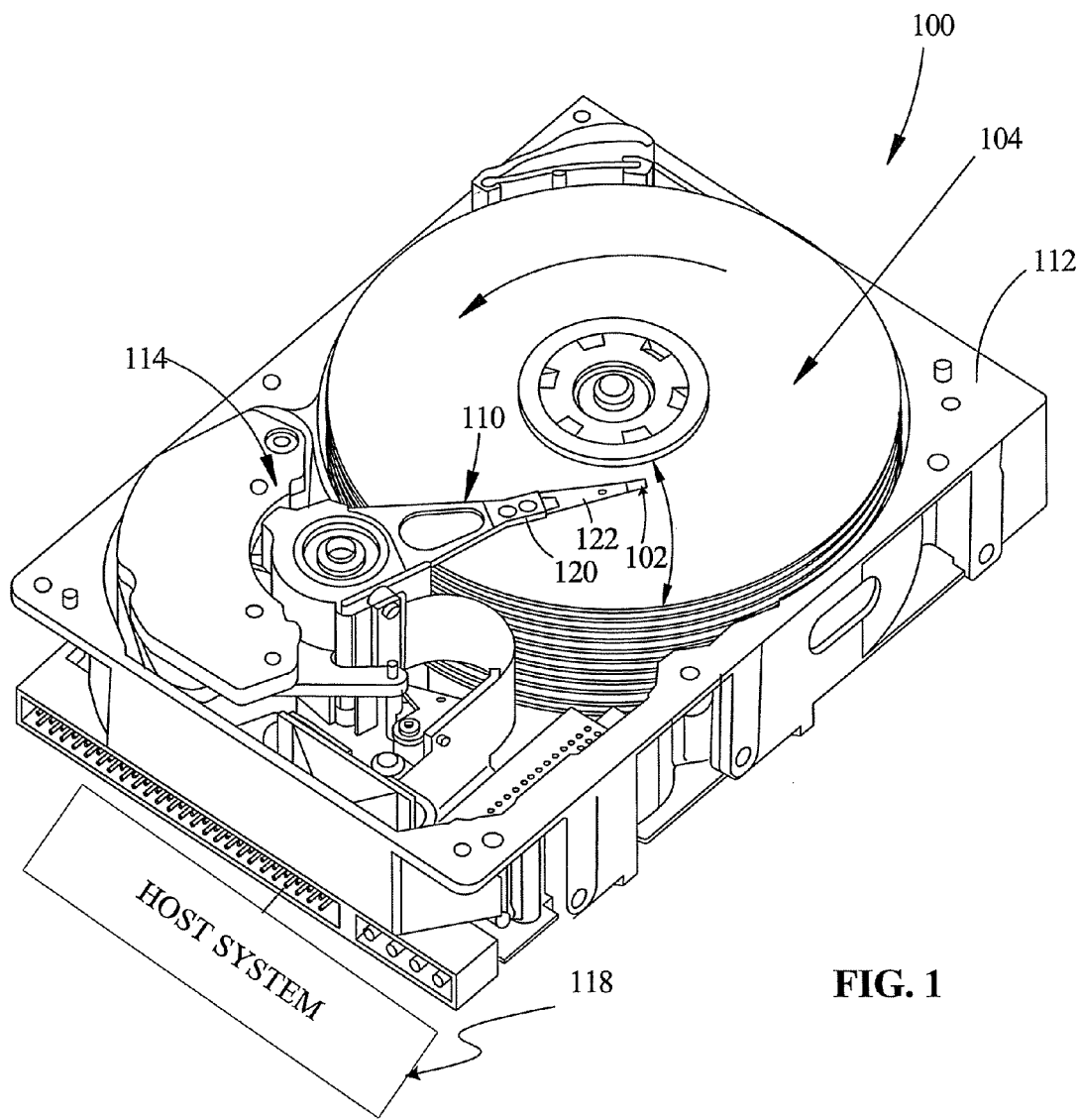
FIG. 1 is a perspective view of an embodiment of a data storage device for which the present application can be used.

FIG. 1 is a perspective illustration of an embodiment of a data storage device 100 in which the present invention can be used. As shown in FIG. 1, a cover (not shown) of the data storage device 100 is removed to illustrate components of the device. The device includes heads 102 which read and/or write data to a disc or data storage medium 104. In the embodiment shown, the data storage device 100 includes a plurality of heads 102 and a plurality of discs 104 or disc pack although application is not so limited, for example, the data storage device can include a single disc.

Heads 102 are coupled to an actuator assembly to position the heads 102 relative to data tracks on the disc surface. In the illustrated embodiment, the actuator assembly includes an actuator block 110 rotationally coupled to a base chassis 112 of the device. The actuator block 110 is rotated via a voice coil motor (VCM) 114 to move the heads along an arcuate path between an inner diameter and an outer diameter of the disc or discs 104. Voice coil motor 114 is driven by servo electronics based on signals generated by the head(s) 102 and a host computer or system 118 as schematically shown.

The actuator block 110 of the actuator assembly includes arms 120. Heads 102 are coupled to arms 120 of the actuator block 110 via a head suspension assembly 122. The head suspension assembly 122 includes a load beam which supplies a load force to the head at a load point. The head is coupled to the load beam or suspension assembly through a gimbal spring (not shown in FIG. 1) to allow the head to pitch and roll relative to the load point to follow the topography of the disc surface.

Figure 2:
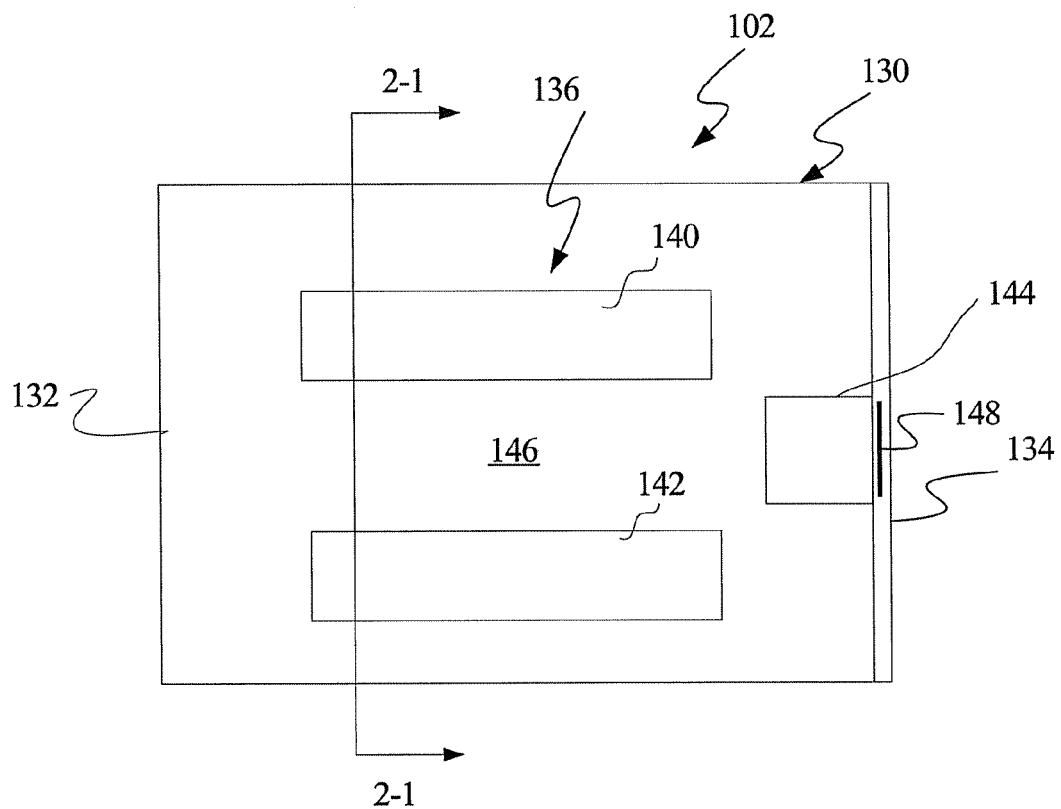
FIG. 2 illustrates a head or slider including an air bearing surface.
Figures 1, 2:
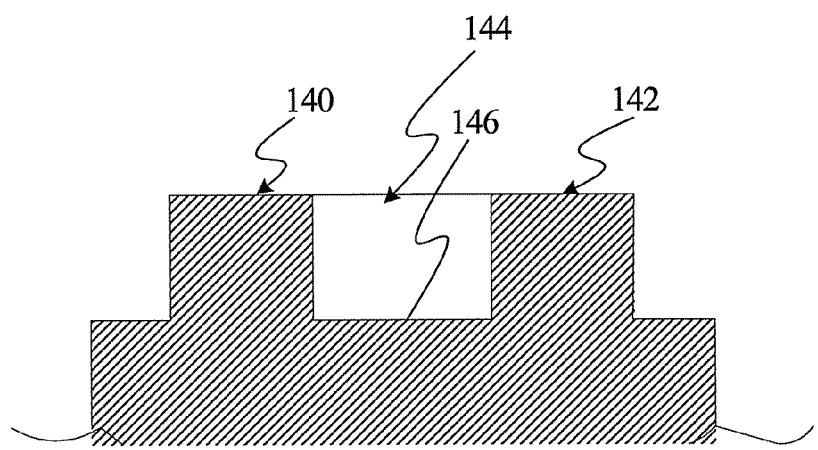

As shown in FIG. 2, the head 102 includes a slider body 130 having a leading edge 132 and a trailing edge 134. An air bearing surface 136 including a raised bearing surface and a recessed bearing surface is fabricated on the slider body 130. The air bearing surface 136 faces a surface of the data storage media or disc 104. In an illustrated embodiment, rotation of the disc 104 creates an air flow path along the air bearing surface 136 of the head 102. Air flows along the air bearing surface 136 from the leading edge 132 to the trailing edge 134 of the slider body. For proximity or near proximity recording, the air flow along the air bearing surface 136 is pressurized to provide a lifting force so that the head "floats" above the data storage media or disc 104. In illustrated embodiments, the air bearing surface 136 of the head is patterned using known etching processes to provide an optimum pressure profile and pitch for read and/or write operations.

In the embodiment illustrated in FIGS. 2 and 2-1, the air bearing surface 136 includes raised rails 140, 142 and a center raised pad 144 elevated above recessed bearing surface 146, although application is not limited to the specific air bearing surface shown. For example, the air bearing surface 136 can include opposed side rails or other designs. Transducer element or elements 148 are fabricated proximate to the trailing edge 134 of the slider body to read or write data to the disc surface.

Figure 3:
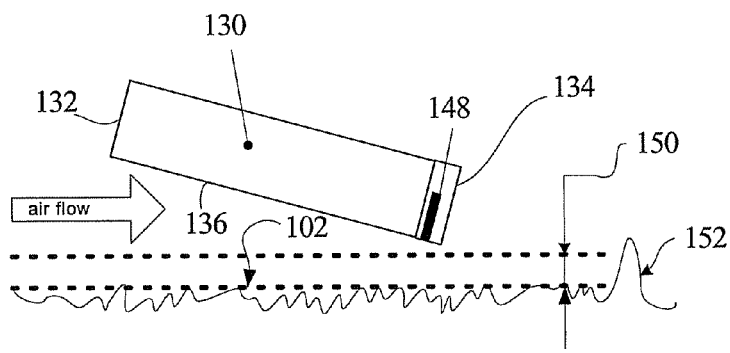
FIG. 3 schematically illustrates a head-media interface and head-media spacing.
Figures 1, 3:
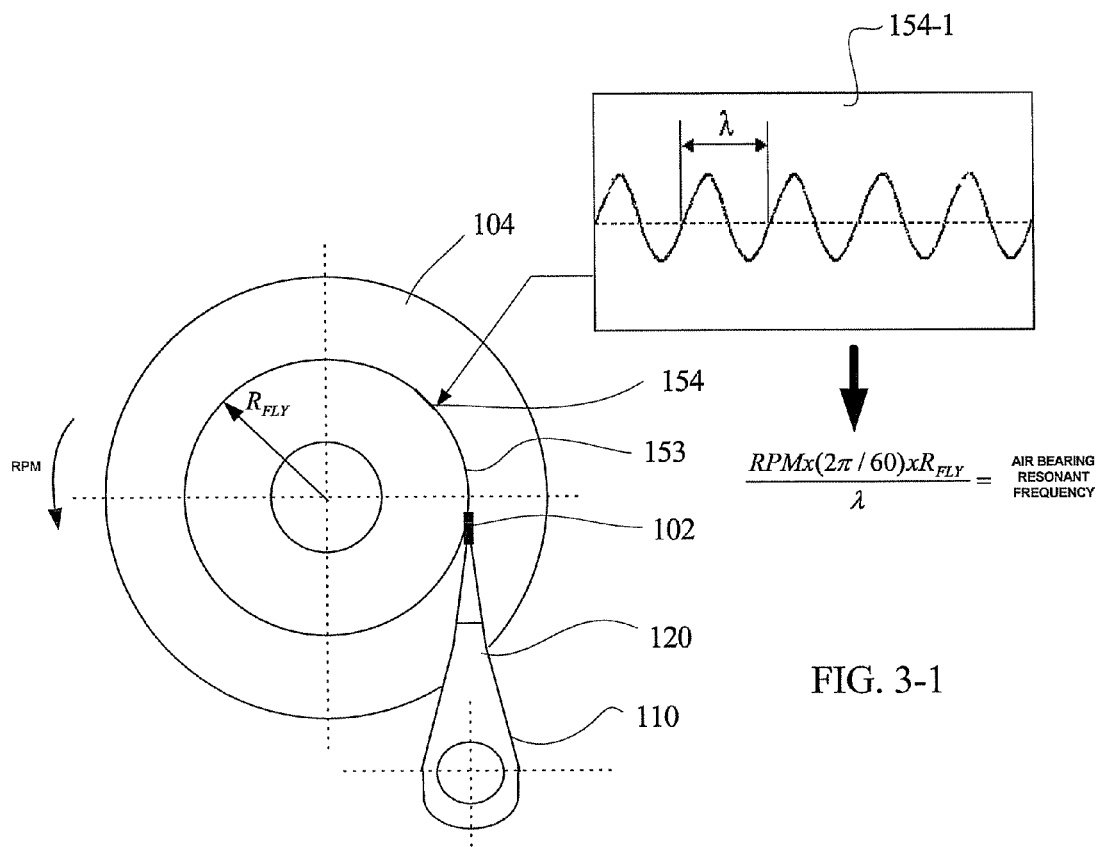

As shown in FIG. 3, rotation of the disc creates an airflow along a disc surface to pressurize the air bearing surface 136 so that the slider "flies" over the disc surface for operation. Air flows from the leading edge 132 of the slider body 130 toward the trailing edge 134 of the slider body to pressurize the air bearing surface of the slider body 130. The slider or head is typically supported at a pitch angle so that a trailing edge 134 of the slider or head flies closer to the disc surface (close point of the head) than the leading edge 132 to position the transducer elements 148 proximate to the disc surface for read or write operations. The distance between the transducer elements 148 and the disc surface is referred to as head-media spacing 150 as shown in FIG. 3. Variations in the head-media spacing 150 affects read-write resolution and clarity.

As illustrated in FIG. 3, the disc surface is not perfectly smooth and can include asperities 152 or disc waviness. During operation, the head can contact asperities (e.g. asperity 152) on the disc surface. Contact between the head and the disc surface can damage the head and create an unstable head-media interface. For example, as illustrated in FIG. 3-1, a track 153 as shown includes a microwaviness sector 154 as illustrated in exploded block 154-1.

Typically, prior to use, a glide head or other head, is used to map asperities on the disc surface at the drive level or on a dedicated spinstand as is known in the art. In particular, contact with an asperity (e.g. asperity 152) excites vibration modes of the glide or slider body or head (e.g. structural modes of the slider or head). A sensor on the glide body detects contact or high level interference via excitation of the structural modes of the glide body to map asperities on the disc surface. The asperities 152 are mapped to avoid reading data to bad disc sectors. Based upon the disc scanning process, defective discs are rejected to avoid assembling a defective disc or media in a production drive or device.

Typically, the air bearing surface 136 can accommodate for disc waviness to provide a relatively stable fly height or head-media interface for desired read and/or write resolution. However, as form factor size decreases and drive storage density increases, head-media spacing parameters are decreasing and it is more difficult for the air bearing surface 136 to compensate for disc waviness and provide a stable fly-height or head-media interface.

In particular, in a proximity, or near-contact regime of operation, the head-media spacing parameters are in the 10 nm range or below. In these regimes, unstable head-media interface behavior can occur in the absence of physical head-disc contact. An example of such behavior would be air bearing instabilities (leading to transient fly height modulation) driven by intermolecular (van der Waals) adhesive forces and/or transient meniscus formation (as the lubricant present on the surface of the recording media bridges the head-media spacing or interface). Such air bearing instabilities detrimentally impact data writing and/or readback performance. Another example of a non-contact-induced instability would be tribocharging-driven electrostatic discharge across the head-disc interface which could lead to data loss, head degradation, or both. Sensors which detect contact interference are not sensitive to non-contact induced instability or onset of contact.

Additionally, head-disc interaction at the "onset of contact" or under full (heavy interference) contact conditions can detrimentally impact head-disc interface integrity. In the head-disc interface context, "onset of contact" is a "low-energy" physical interaction between a head and disc where the (real) area of contact is very small either because the contact is very localized (e.g., the contact of a protruded R/W pole with the disc in the case of a head disc interface in which a recording head having a pole tip actuation device, such as a heater element for head-media spacing control is used), or because contact is defined by the interaction of the tallest asperities present on both head and disc surfaces—a very low level of interference contact. Prior sensors which detect excitation of slider structure modes are not particularly sensitive to low level interference.

Figure 4:
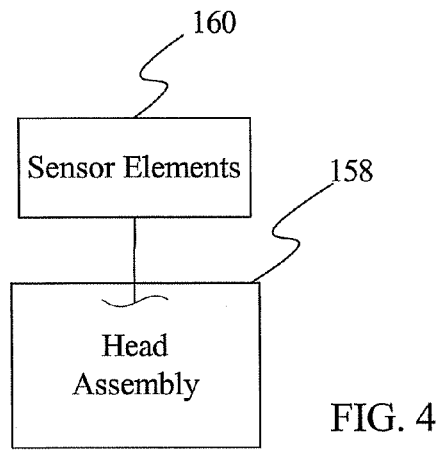
FIG. 4 is a block diagram of an embodiment of the present invention illustrating a head assembly including a sensor element.
Figures 1, 4:
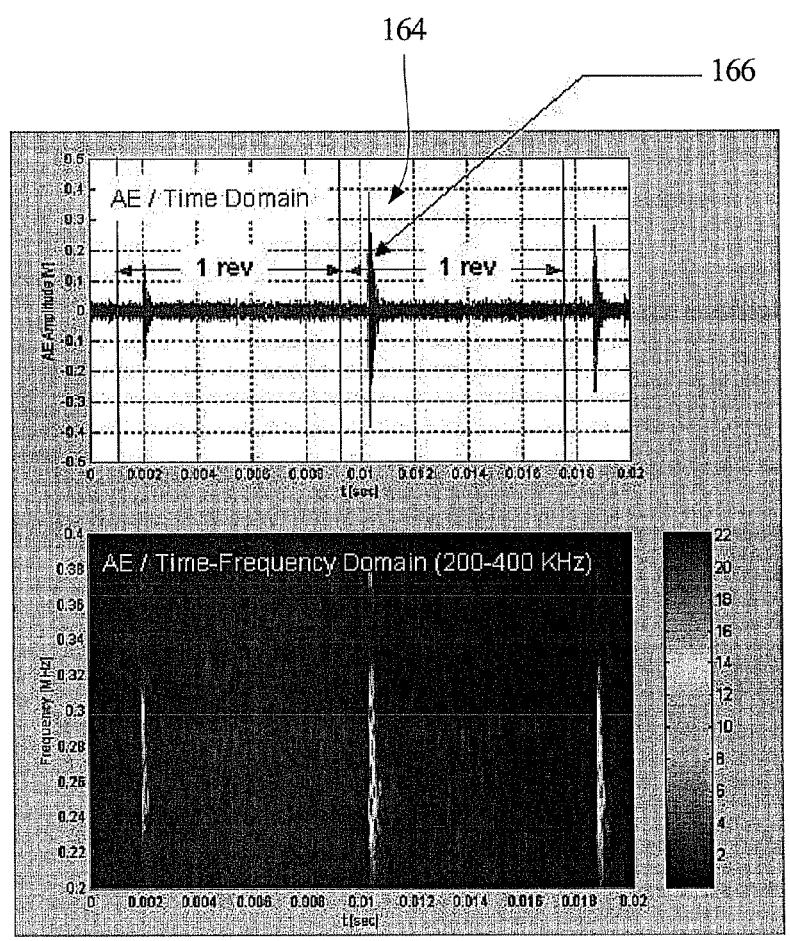
Figures 2, 4:
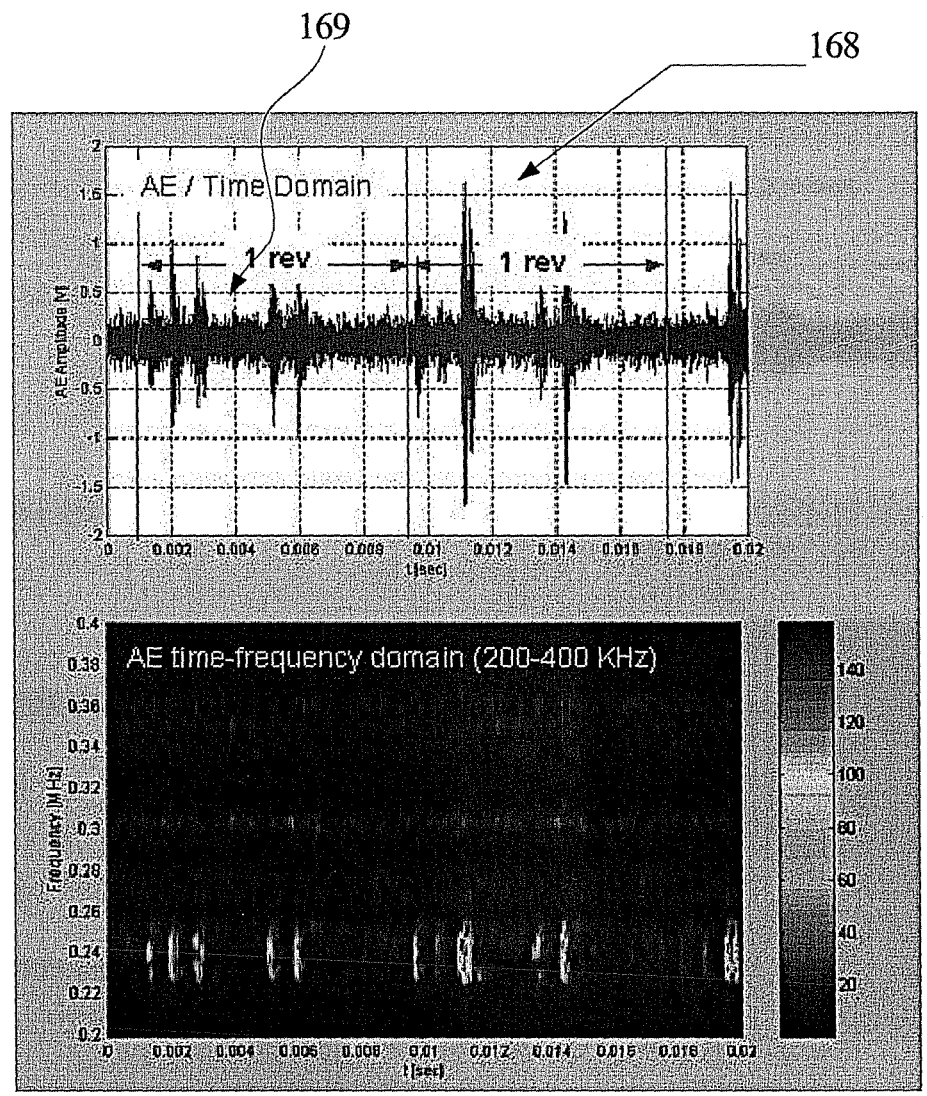

FIG. 4 schematically illustrates a head assembly 158 configured to detect low level interference or non-contact instabilities. The head assembly is coupled to the suspension assembly 122 and as schematically shown in FIG. 4, the head assembly 158 includes a sensor element 160 which provides feedback corresponding to excitation of air bearing resonance modes.

In embodiments described, the sensor element 160 detects "non-contact induced instabilities", "onset" of contact and contact by monitoring air bearing resonance modes of the slider body. Detection of the air bearing resonance modes is a more sensitive method for head-disc contact detection or detection of fly height instabilities.

Typically for an AlTiC slider body, vibration modes or structural modes have a characteristic frequency range of 0.80-4 MHz. For slider structural modes to get excited during head-disc contact events, the strain energy dissipated in such events must be high which generally requires high levels of interference between the head and the disc. In contrast, the sensor element 160 or sensor of the present application is configured to detect low frequency excitation of air bearing resonance modes. The low intensity contact events, which would not normally lead to excitation of the slider structural modes will cause air bearing (dynamic fly) instabilities. Monitoring of air bearing mode excitation constitutes a more sensitive approach to head-disc contact or fly height instability detection.

FIG. 4-1 illustrates feedback 164 in 100-400 kHz range including air bearing resonance excitation 166 corresponding to non-contact instability. As shown, the excitation occurs at the same position for each revolution since the excitation is induced by an area or sector of microwaviness (e.g. sector 154). In FIG. 4-2, feedback 168 illustrates contact induced excitation 169, which in the illustrated example is provided via actuation of a head-media spacing actuator which is energized to adjust head-media spacing.

In illustrated embodiments, the sensor element or sensor detects air bearing resonant modes in a frequency range below 1.0 MHz or 0.8 MHz or below 500 kHz, and preferably in a frequency range of approximately 100 kHz to 400 kHz. The low frequency excitation of the slider or head assembly is detected using a sensor element having a relatively low resonant frequency or by configuring sensor circuitry (not shown in FIG. 4) to detect low frequency excitation of the sensor element 160.

Figure 5:
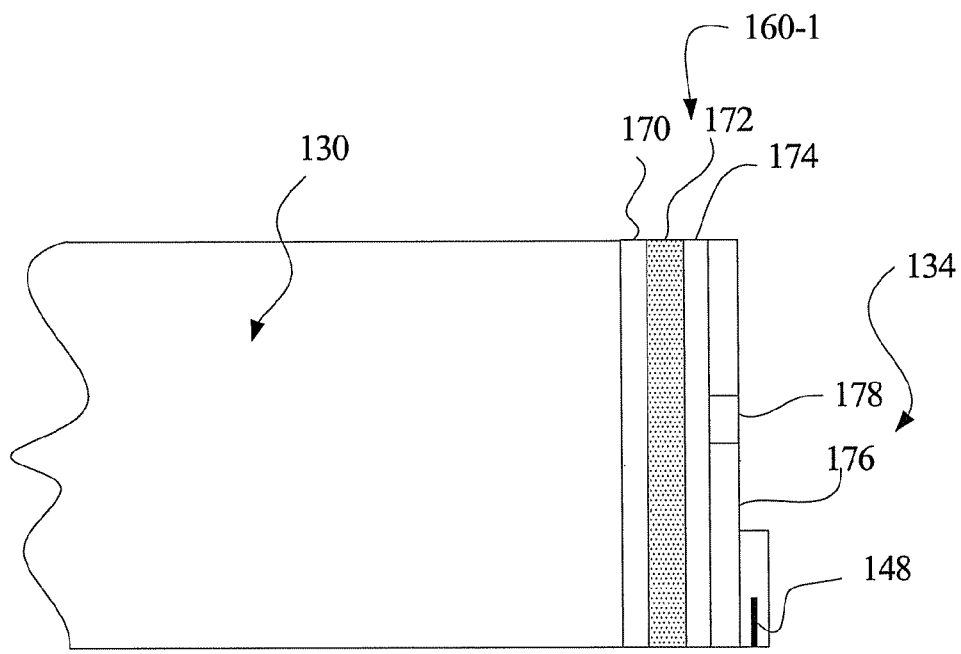
FIG. 5 schematically illustrates an embodiment of a head having a sensor element fabricated proximate to a trailing edge of the slider body.

FIG. 5 illustrates an embodiment of a head assembly including a sensor element 160-1 fabricated on the slider body 130 using known thin film deposition processes. Sensor element 160-1 is fabricated proximate to the trailing edge 134 of the slider body. The transducer element or elements 148 are fabricated adjacent the sensor element 160-1. In particular, as shown in the embodiment of FIG. 5, a first electrode 170 is fabricated or deposited on a slider substrate such an AlTiC substrate. A sensor layer 172 is fabricated adjacent to the first electrode 170 and a second electrode 174 is fabricated proximate to the sensor layer 172 to form the sensor element proximate to the trailing edge 134 of the slider body.

A base coat 176 is deposited over the sensor element 160-1 and the transducer element or elements 148 are fabricated over or proximate to the base coat 176 by known fabrication techniques. As described, the sensor element 160-1 is positioned proximate to the transducer element or elements 148 at the trailing edge 134 of the slider body to provide desired detection sensitivity for detecting non-contact induced instabilities, "onset of contact" or low level interference. In the embodiment shown, vias 178 for leads can be etched in the base coat 176 to provide an electrical connection to control or detection circuitry (not shown in FIG. 6).

In one embodiment, sensor layer 172 is formed of a piezoelectric material, ferroelectric material or material sensitive to acoustic emission. For example, suitable materials for the thin film sensor layer (shown in FIG. 5) include Lead-Zirconate Titanate ("PZT"), Aluminum Nitride (AlN) and Zinc Oxide (ZnO). Among these materials, AlN is particularly attractive because of its good affinity with AlTiC substrates of the slider body and its high piezoelectric coefficient.

Figure 6:
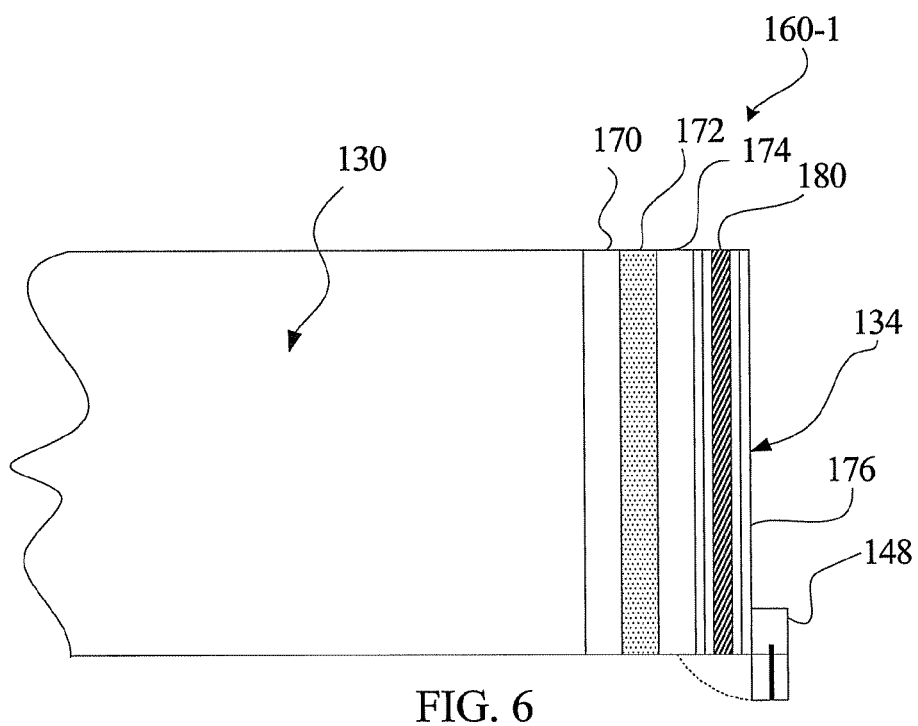
FIG. 6 schematically illustrates an embodiment of a head having a sensor element and heating element fabricated proximate to a trailing edge of the slider body.
Figure 7:
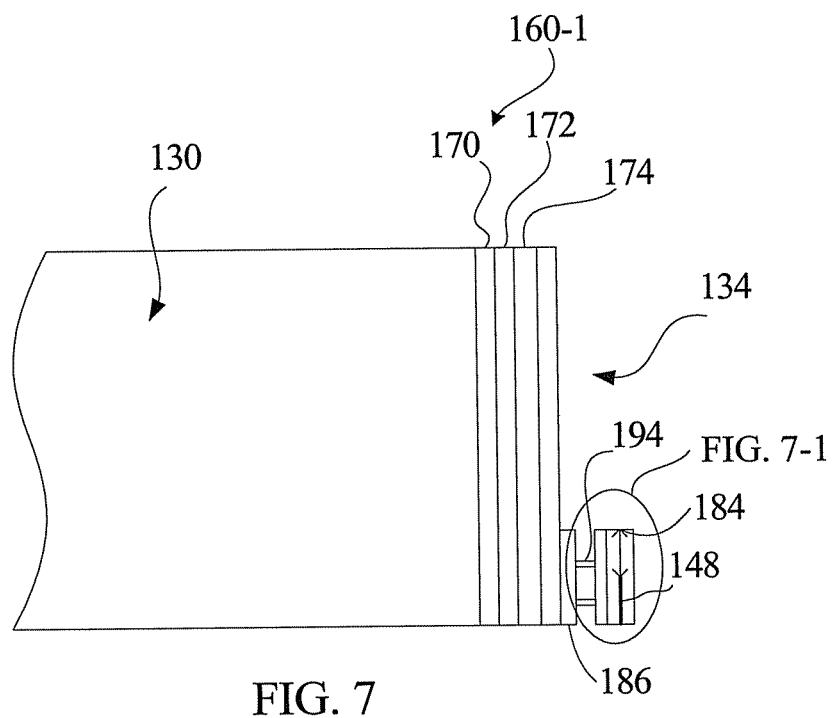
FIG. 7 schematically illustrates an embodiment of a head having a sensor element and electrostatic elements fabricated proximate to a trailing edge of the slider body.
Figures 1, 7:
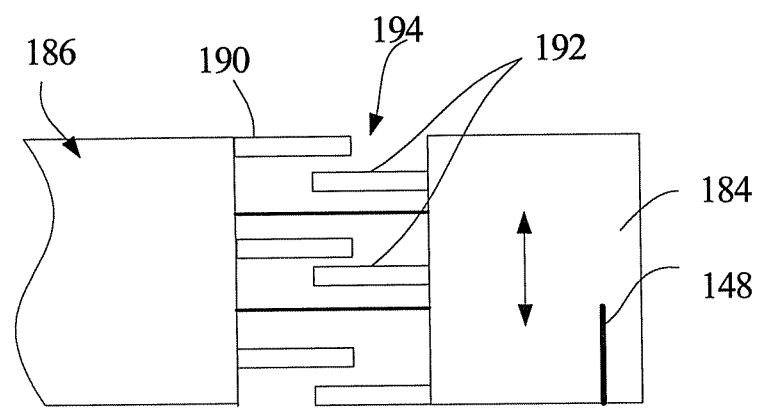
Figure 8:
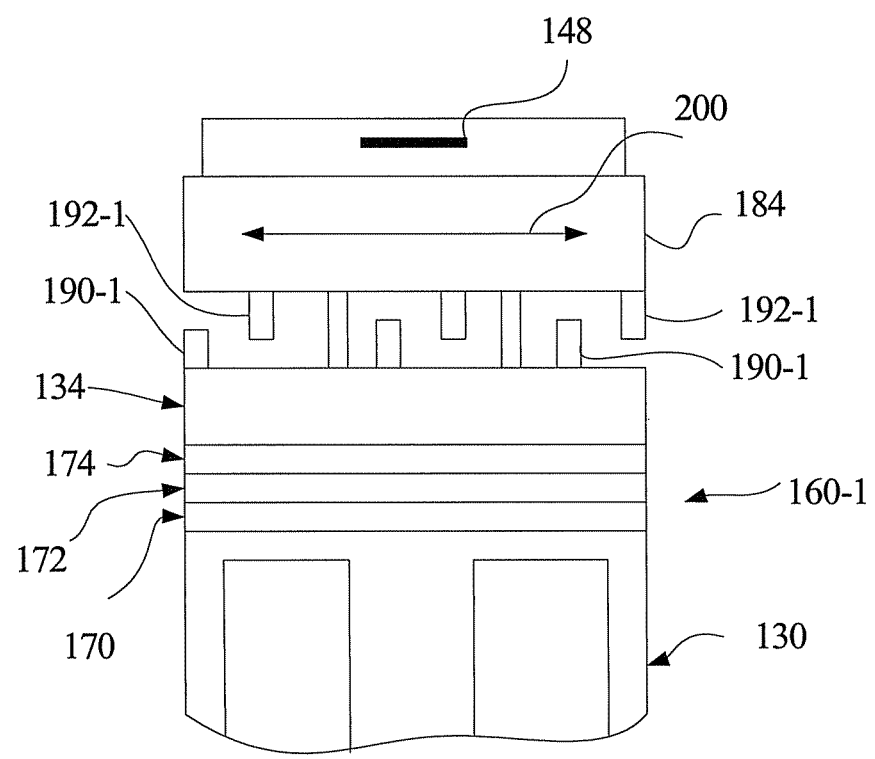
FIG. 8 schematically illustrates an embodiment of a head having a sensor element and electrostatic elements to form an off-track microactuator for track following.

FIGS. 6-8 illustrate various applications of a slider including a sensor to detect slider instabilities with a microactuator or microactuator element to microactuate the head. In the embodiment shown in FIG. 6, the head assembly includes a microactuator element 180 in combination with the sensor element 160-1 to adjust a position of the transducer element 148 or head-media spacing on the head assembly. The microactuator element 180 is energized to actuate the head in addition to or in combination with the suspension level actuator or voice coil motor 114. In the embodiment shown, the sensor element 160-1 and the microactuator element 180 are fabricated on the slider body 130.

In the embodiment shown in FIG. 6, the microactuator element 180 is a thermal or heating element fabricated proximate to the trailing edge 134 of the slider body 130. The heating element is energized by supplying a voltage or current to the heating element to generate a localized thermally induced protrusion of the transducer elements 148 (e.g. write pole/read element) as illustrated in phantom in FIG. 6. The localized protrusion of the transducer portion of the slider body relative to an air bearing surface of the slider body compensates for head-media spacing fluctuations or slider instabilities.

The heating element is preferably formed of a resistive element or wire which is fabricated on the slider body using known thin film fabrication techniques. The heating or resistive element is embedded between insulating layers. The size and shape of the heating element is designed to provide desired actuation stroke relative to available current or voltage supplied to energize the heating element.

In an alternate embodiment illustrated in FIGS. 7 and 7-1, the sensor element is fabricated on the head assembly in combination with an electrostatic element to form a microactuator to microposition the head or transducer elements 148. As shown in FIGS. 7 and 7-1, the transducer elements are fabricated on a floating transducer body 184, which is movably supported relative to a base portion 186 of the slider body. The floating transducer body 184 is actuated relative to the base portion 186 to adjust a reference or datum position of the transducer elements 148 relative to the slider body or base portion 186. The floating transducer body 184 is actuated via electrostatic combs 190, 192 fabricated in a gap 194 between the floating transducer body 184 and base portion 186.

As shown, the electrostatic combs 190, 192 includes a static electrode comb 190 on the slider body and a dynamic electrode comb 192 on the floating transducer body 184. The electrode combs 190, 192 include a plurality of interspersed electrode fingers which are energized to provide z-height actuation. In an alternate embodiment illustrated in FIG. 8, the combs 190-1, 190-2 on the slider body and the floating transducer body 184 are orientated to provide actuation in the off-track direction as illustrated by arrow 200. The floating transducer body and electrostatic combs are fabricated using micro-electro-mechanical (MEMS) fabrication techniques or processes.

Figure 9:
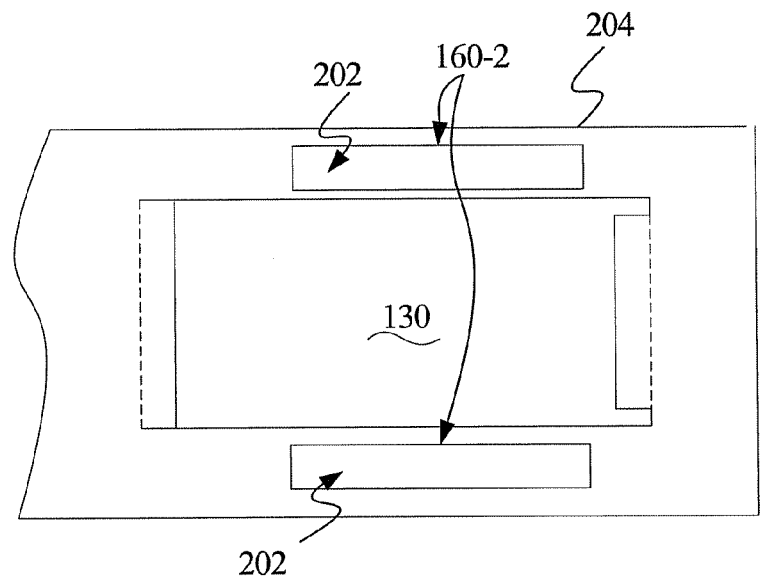
FIG. 9 schematically illustrates an embodiment of a head assembly including a piezoelectric or sensing element on gimbal arms to detect slider modulations.
Figures 1, 9:
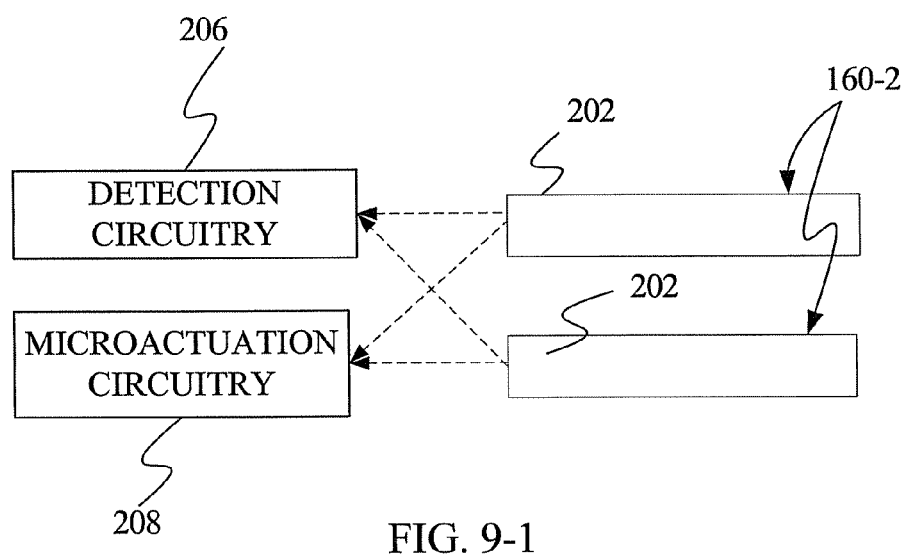

Alternatively as shown in FIG. 9, the sensor element(s) 160-2 are fabricated on a gimbal spring 204, gimbally connecting the slider body to the head suspension assembly 122. In the illustrated embodiment, the sensor element 160-2 includes a piezoelectric or ferroelectric body or element 202. As described, the sensor element 160-2 or piezoelectric element 202 is configured to detect low frequency excitation corresponding air bearing resonance modes as described.

In the embodiment illustrated in FIG. 9-1, detection circuitry 206 is coupled to the sensor or piezoelectric element(s) and receives a voltage signal from the sensor element(s) 160-2 corresponding to excitation of the sensor or piezoelectric element(s) indicative of non-contact instabilities or low level interference as described with respect to previous embodiments. Additionally, in the embodiment shown in FIG. 9-1, microactuation circuitry 208 is connected to the sensor element or piezoelectric element(s) to form a microactuator element to microactuate the head or transducer element(s) on the head assembly. Thus for operation, voice coil motor 114 is energized to position the head suspension assembly 122 and the microactuator is energized for fine head positioning of the head 102.

As described in FIG. 9-1, in a mapping or sensing mode, a voltage signal is detected by the detection circuitry 206 coupled the piezoelectric element 202, corresponding to excitation of the air bearing resonance modes of the head or slider body. In an actuating mode, a voltage signal is supplied to strain the piezoelectric elements 202 to microactuate the head as shown in FIG. 9-1. In alternate embodiments, detection circuitry and microactuation circuitry are coupled to separate sensor and actuator elements as illustrated in previous figures.

Figure 10:
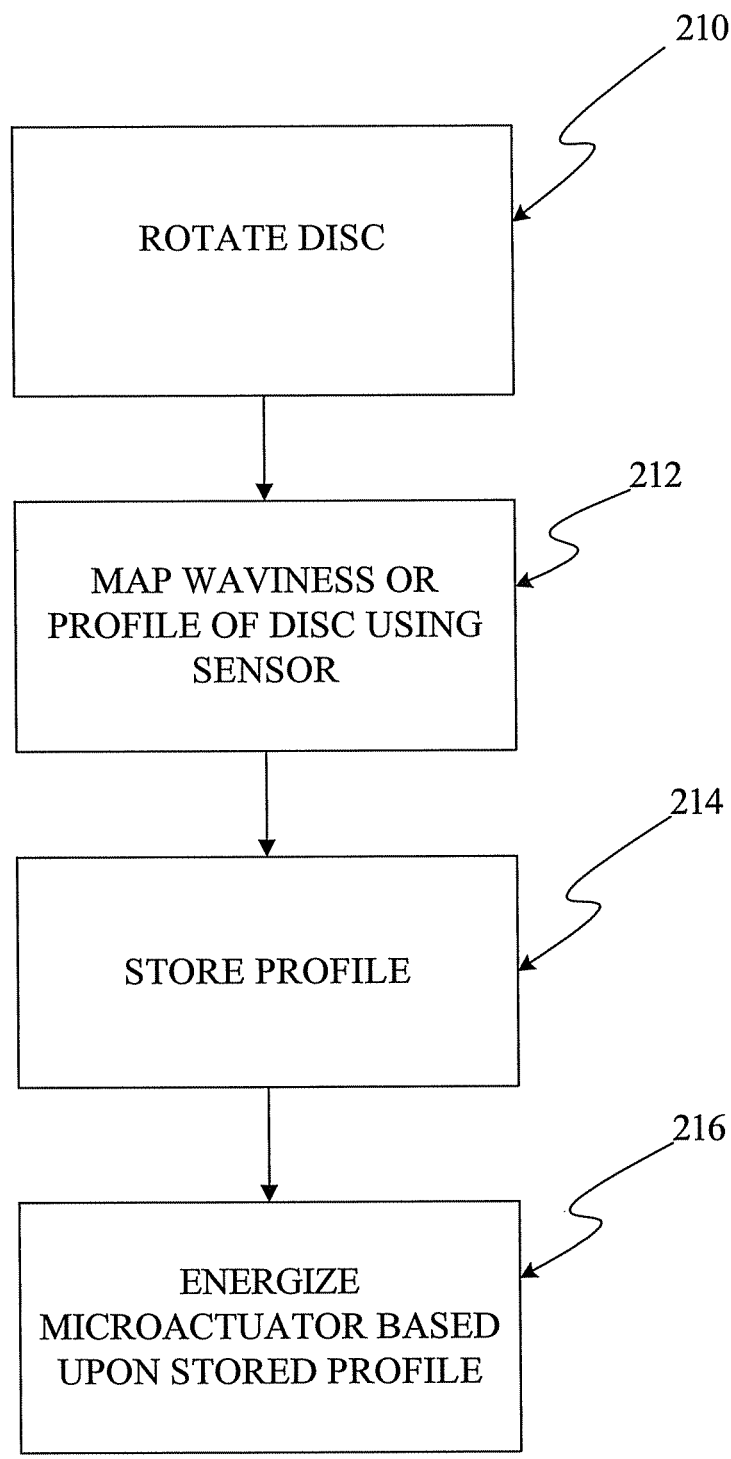
FIG. 10 is a block diagram illustrating an embodiment of the present application to map or profile a disc surface using head-media feedback.

The sensor or sensor element(s) provide a way to detect one or more of non-contact instability, "onset" of contact and contact. This detection is provided by way of feedback. In an embodiment illustrated in FIG. 10, the feedback is used to map or profile the disc surface or head-media interface. As illustrated in FIG. 10, the disc is rotated 210 to pressurize the air bearing surface 136 of the sensor head. The head is positioned relative to data tracks on the disc surface via a voice coil motor or actuator assembly to map the disc surface 212. Feedback from a sensor element on the head is used to map or profile the disc surface. The profile or sensor feedback can be stored in system memory 214.

In the embodiment illustrated in FIG. 10, the sensor feedback is used to energize a microactuator 216, for example, to compensate for variations in the media surface topography. Application of the microactuator to compensate for head-media interface variations or instability provides tight tolerance control of the fly height and head-media spacing for read and/or write resolution and clarity.

Figure 11:
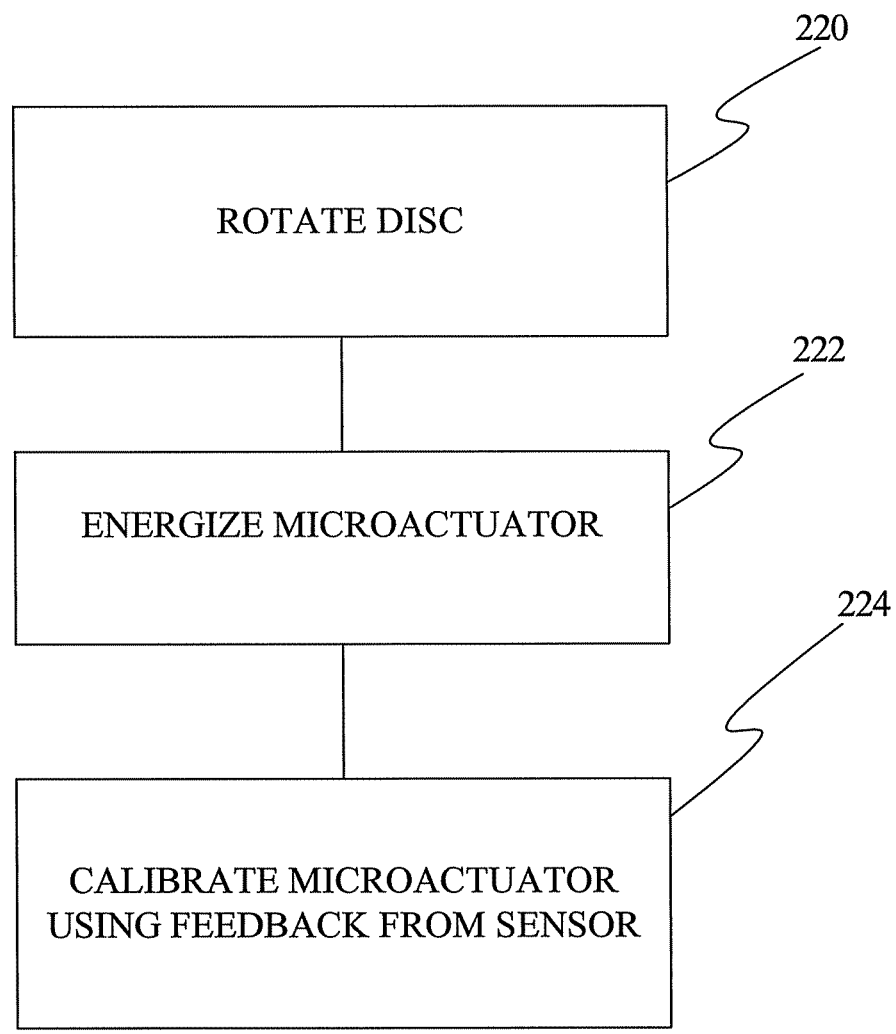
FIG. 11 is a block diagram illustrating an embodiment of the present invention to calibrate or determine parameters or limits of a microactuator.

In another embodiment, illustrated in FIG. 11, a sensor element is used to calibrate or determine operational limits of a microactuator on the sensor head. For example, for calibration, the disc is rotated 220 to pressurize the air bearing surface on the head. Next, the microactuator element is energized 222 at different voltage levels or amplitudes and the sensor element provides acoustic feedback to calibrate parameters or operational limits of the microactuator for different energization levels or voltages 224.

Feedback from the sensor element is used to optimize microactuator stroke or parameters such as, maximum pole tip protrusion for a dedicated micro-heater element. Because the area of contact of the protruding pole is very small or because the contact is localized, the physical interaction is low energy and the interference between the head and disc is small. As described, in illustrated embodiments, the sensor detects the low levels of physical interference in contrast to high energy contact interaction that would be required to excite slider structural modes.

The sensor described provides advantages over prior sensors, which require high level contact interference. High contact interference could damage the head as a result of exposure to high interfacial thermo-mechanical stress, and/or due to accelerated burnishing or wear of the head and/or media protective overcoats which would compromise the resistance of the head or media to corrosion. The sensor of the present application is used to detect contact or "onset of contact" between the head and disc to calibrate the microactuator without compromising the near- and/or long-term reliability of the head, disc or both.

Intermittent or cyclical energization of a microactuator element such as a heating element illustrated in FIG. 6 can damage or crack the substrate or thin film layers of the head. For instance, if a dedicated micro-heater element is used to attain superior data writing performance via thermally-induced protrusion of the write pole or transducer elements, then use parameters such as maximum heater power or, equivalently, maximum write pole protrusion, would have to be set so that the risk for heater and/or head failures due to, for example, electromigration, and thermal and/or mechanical fatigue is minimized or eliminated. Having the ability to detect and characterize such types of failures at the spinstand level (prior to assembly in a disc drive) or drive level (after the head is assembled in a disc drive) provides benefits in the design optimization of proximity or near-contact heads.

Figure 12:
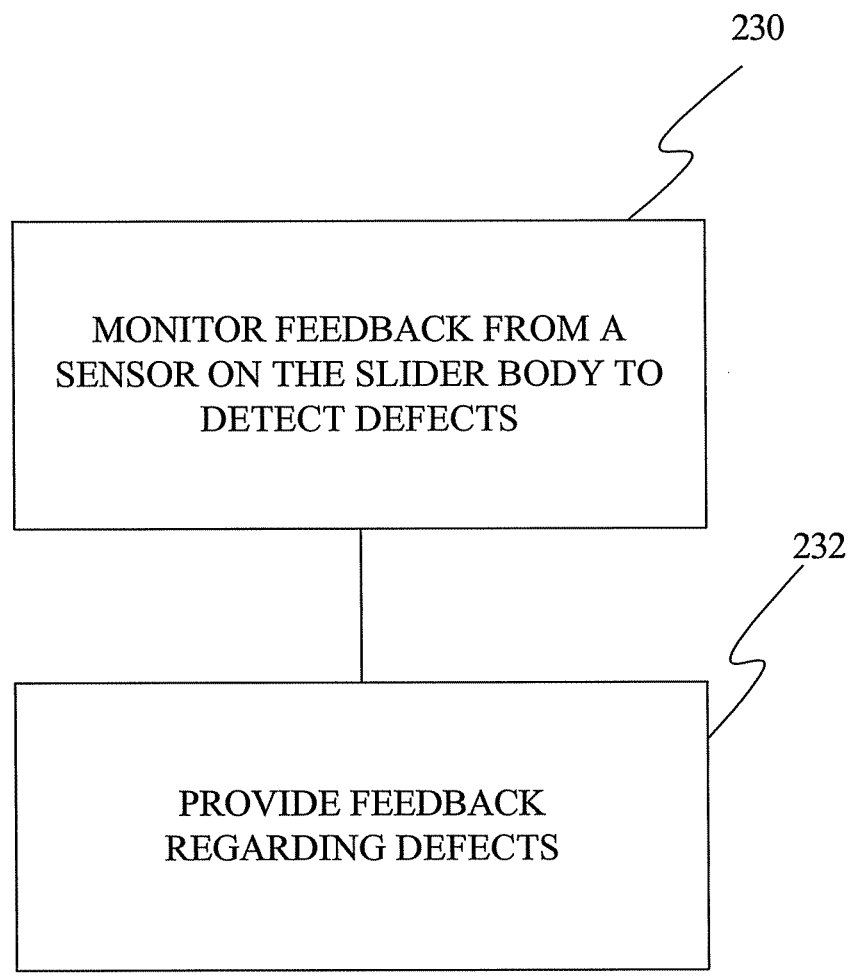
FIG. 12 is a block diagram illustrating an embodiment of the present invention to detect defects in the head, transducer elements or thin film structure.

In the embodiment illustrated in FIG. 12, a sensor element is configured to detect acoustic emission transmitted from a crack or defect in the head to monitor or detect damage to the head or thin film layers of the head. For example, strain energy or heat is released or propagates from the cracks or defect. As shown in FIG. 12, feedback from the sensor element on the head is monitored by a monitoring circuit to detect defects 230 to provide feedback regarding defects 232. In particular, the dissipated strain energy or stress waves excite the sensor element. Excitation of the sensor element is monitored to detect defects or cracks in the head or thin film layers of the head.

Figure 13:
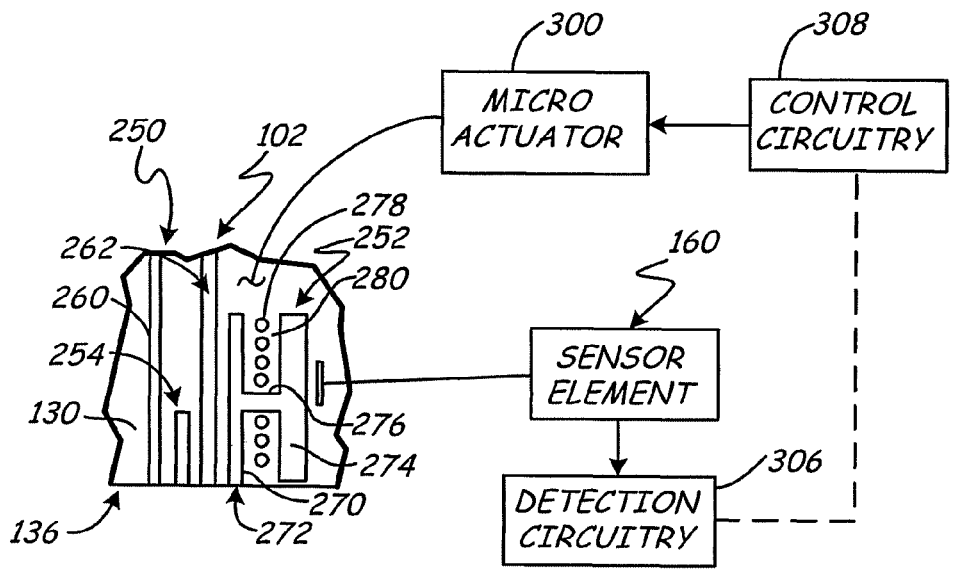
FIG. 13 is a detailed illustration of a trailing edge portion of a head having a sensor element to detect head-media spacing and an actuator to adjust head-media spacing.

FIG. 13 is an illustration of a trailing edge portion of a head 102 including a read element 250 and a write element 252 along the air bearing surface 136 of the head 102 or slider body 130. In the illustrated embodiment, the read element 250 includes a transducer layer or portion 254 disposed between opposed spaced shield layers or portions 260, 262. Illustratively, the transducer layer or portion 254 includes a magnetoresistive, giant magnetoresistive (GMR), tunneling magnetoresistive (TMR) layer or other layers or portions which are configured to read magnetically encoded data as known by those skilled in the art.

As shown, the write element 252 includes a main pole 270 having a pole tip 272 facing the media surface and auxiliary or return pole 274. The main pole 270 and auxiliary pole 274 are magnetically connected via a yoke portion 276 to form a magnetic flux path to write data to the media as is known by those skilled in the art. A conductive coil 278 is wound about the yoke portion 276 to induce the magnetic flux path in the main pole 270 and the auxiliary pole 274. An insulating portion 280 fills a gap or area between the main pole 270 and auxiliary pole 274 and surrounds the conductive coil 278 to electrically insulate the conductive coil 278 from the main and auxiliary poles 270, 274. In the illustrated embodiment, the auxiliary pole 274 is aft of the main pole 270 (e.g. closer to the trailing edge of the slider body) however application is not limited to the particular orientation shown. For example, the auxiliary pole 274 can also be located forward of the main pole 270 in an alternate embodiment.

In the illustrated embodiment, the head 102 includes a microactuator 300. The microactuator 300 is energizable to provide localized actuation of the write pole or tip 272 to control spacing between the write pole and the media surface. In other exemplary embodiments, the microactuator 300 is energized to actuate the read element 250 to control head-media spacing 150. Also, as shown, the head includes the sensor element 160 as previously described. As previously described, the sensor element 160 is excited responsive to changes in head-media spacing or air bearing resonance. Excitation of the sensor element 160 produces an electrical signal responsive to changes in the head-media spacing. The electrical signal from the sensor element 160 is processed by detection circuitry 306 (illustrated schematically).

Output from the detection circuitry 306 is utilized by control circuitry 308 to energize the microactuator 300 to provide desired pole tip protrusion or head-media spacing. For example, feedback from the sensor element is used to map or profile the disc or media surface. The profile or sensor feedback is stored in system memory 214 and utilized to energize the microactuator 300 or a heating element 310 as described below.

Figure 14:
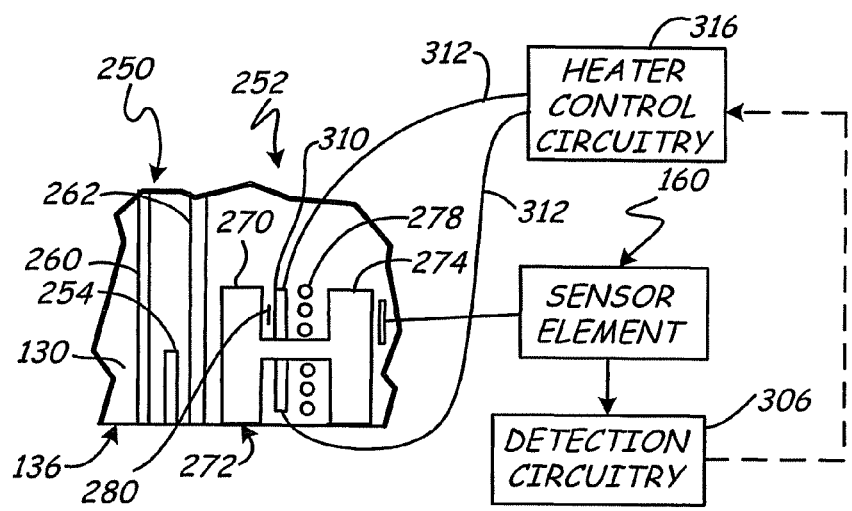
FIG. 14 is a detailed illustration of a trailing edge portion of a head having a sensor element to detect head-media spacing and a heating element to a localized protrusion of a write pole or other transducer elements.

FIG. 14 illustrates an embodiment of a trailing edge portion of a head 102 similar to FIG. 13 where the microactuator 300 includes heating element 310 energizeable to provide a localized protrusion of the transducer element (s) (e.g. write pole tip 272 or read element 250). In the illustrated embodiment, the heating element 310 is a resistive wire or element that is deposited in the insulating portion 280 of the write element between the main pole 270 and auxiliary pole 274. As schematically shown, lead(s) 312 (illustrated schematically) connect the resistive wire or heating element 310 to heater control circuitry 316 to supply current to energize or heat the heating element 310. In an illustrated embodiment, lead(s) 312 are formed using thin film deposition and etching techniques.

FIGS. 15-16 illustrate an embodiment of a head 102 including a sensor element 160 and heating element 310 to control protrusion of the transducer elements or write pole as previously described. In the illustrated embodiment, the read element 250 is fabricated on an end portion of a slider substrate 320 via known deposition techniques. Illustratively, the slider substrate 320 is formed of Aluminum oxide-titanium carbide ($Al_2O_3$_TiC) or other ceramic material. The read element 250 includes the transducer layer or portion 254 and shield layers or portions 260, 262 as previously described. The write element 252 is deposited or fabricated on top of the read element 250.

As shown, the write element 252 includes main pole 270 and a leading edge auxiliary pole 274-1 and a trailing edge auxiliary pole 274-2 connected to the main pole 270 via yoke portions 276-1, 276-2. Coils 278-1, 278-2 are wrapped around yoke portions 276-1, 276-2 and energized to induce the magnetic flux path in the main pole 270 and the auxiliary poles 274-1, 274-2. The insulating portion or area 280 between the main pole 270 and auxiliary poles 274-1, 274-2 surrounds the conductive coils 278-1, 278-2 to electrically insulate the conductive coil 278-1, 278-2 from the main and auxiliary poles 270, 274-1, 274-2. The heating element 310 is fabricated in the insulating portion 280 to provide localized protrusion of the write pole as previously described.

In the illustrated embodiment of FIGS. 15-16, the sensor element 160 is located closer to the trailing edge 134 of the head or slider body (or further from the leading edge 132 of the slider body) than the read and write elements 250, 252 to locate the sensor proximate to the close point between the media and the head. In the illustrated embodiment, the sensor element 160 includes a sensor layer 172 disposed between a leading electrode 170 and trailing electrode 174. In the illustrated embodiment, the sensor layer 172 is a thin film piezoelectric material configured to provide an electrical signal in response to acoustic emissions or disturbance in the piezoelectric material. The piezoelectric sensor layer forms a passive sensor, which does not require a bias current for operation.

In illustrative embodiments, the piezoelectric sensing layer 172 is formed of an Aluminum Nitride (AlN), or Zinc Oxide (ZnO) material which can be deposited at a lower temperature than Lead-Zirconate Titanate (PZT). Application, however is not limited to AlN or ZnO. Detection circuitry 306 as previously described is coupled to electrodes 170, 174 via leads 322, 324 (illustrated schematically) to detect excitation or vibration modes of the piezoelectric sensor layer 172. Illustratively, the circuitry 306 detects vibration or acoustic emission in 50 kHz-2.0 Mhz frequency range. Preferably, the sensor element 160 and circuitry 306 are configured to detect excitation or vibration in a narrow frequency band to limit the affect of noise.

Figures 1, 17:
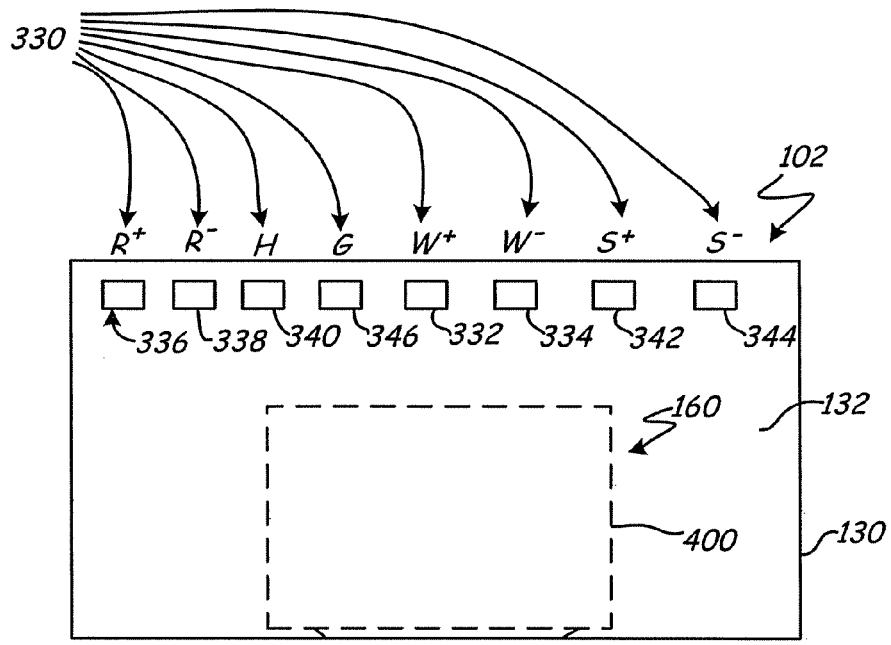
Figures 2, 17:
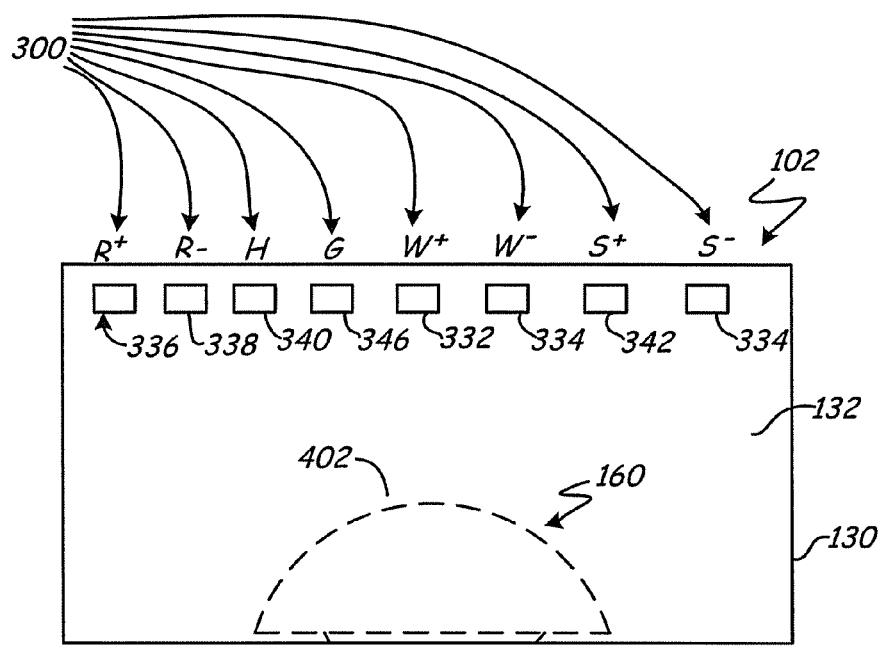

FIG. 17-1 is a trailing end view of an embodiment of the head or slider illustrated in FIGS. 15-16. In the embodiment shown in FIG. 17-1, the trailing end of the slider body include bond pads 330, which provide an electrical interface between the electrical components on the slider body and drive circuitry (not shown in FIG. 17-1). As shown, the bond pads 330 on the trailing end include write element pads 332, 334 to provide an electrical interface to the write element (e.g. coil) and read pads 336, 338 to provide an electrical interface to the read element 250 of the head. The bond pads 330 also include at least one heater pad 340 to provide an electrical interface between the heating element 310 and the heater control circuitry 316 and sensor pads 342, 344 to connect the sensor element or electrodes to detection circuitry 306. Pads 342, 344 connect to the sensor element 160 through leads 322, 324 deposited on the slider substrate during fabrication of the thin film transducer and sensor elements as previously described. A ground pad 346 as shown provides a connection to ground.

In the embodiment illustrated in FIG. 17-1, the sensor element 160 and layers are formed of a rectangular shaped body 400 as illustrated in phantom via known thin film deposition and etching techniques. In an illustrated embodiment, the dimensions of the rectangular shape body 400 is 100 microns by 100 microns. The thickness of the sensor layer is dependent upon the sensitivity of the sensor layer and in an illustrative embodiment is about 2 microns. FIG. 17-2 is another embodiment of an end view of the slider body or head illustrating a sensor element or layers having a semi-circular profile 402, however application is not limited to the illustrated shapes and other shapes can be used as appreciated by those skilled in the art.

In the embodiment shown the leading electrode 170 of the sensor element 160 is separated from the auxiliary pole 274-2 of the write element 252 by an insulating layer to reduce noise or effect of the write element. The sensor element 160 is recessed from the air bearing surface 136 of the slider as a result of different lapping rates and head topography. In an illustrated embodiment, a recessed dimension of the sensor element 160 is in a range of about 2-4 microns. The magnitude of the recessed dimension is limited to control sensitivity or performance of the sensor element 160. As shown in FIGS. 15-16, a protective portion 404, such as an alumina ($Al_2O_3$) or other ceramic/insulating material is deposited over the sensor element 160 to form a trailing edge portion of the slider body or head.

FIG. 18 illustrates an embodiment of a head including a piezoelectric sensor element 160 and microactuator 300 configured to microactuate the read element and/or the write element 250 to control protrusion of the read/write elements as previously described. In the illustrated embodiment, the sensor element 160 is fabricated on the read and write elements 250, 252 to locate the sensor element 160 proximate to the close point between the media and the head.

In the illustrated embodiment, the sensor element 160 includes sensor layer 172 disposed between the leading electrode 170 and the trailing electrode 174. In the illustrated embodiment, the sensor layer 172 is a thin film piezoelectric material as previously described. Feedback from the sensor layer 176 is processed by detection circuitry 306 and is utilized by control circuitry 308 to energize microactuator(s) 300 to provide desired pole tip protrusion or desired head-media spacing 150 between the read and/or write elements 250/252 and the media. Illustrative microactuators 300 utilize magnetostrictive, shape memory, or piezoelectric materials to microactuate the read/write elements in the z-axis direction as described.

It is to be understood that even though numerous characteristics and advantages of various embodiments of the invention have been set forth in the foregoing description, together with details of the structure and function of various embodiments of the invention. This disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. For example, the sensor elements can be formed of various materials or structures that produce an electrical signal responsive to head-media spacing. In addition, although the preferred embodiment described herein is directed to magnetic recording devices having a particular air bearing surface, it will be appreciated by those skilled in the art that the teachings of the present invention can be applied to optical systems and other air bearing design as well as perpendicular or non-perpendicular recording heads, without departing from the scope and spirit of the present invention.

What is claimed is:

1. An assembly comprising:
    a head including a slider body and deposition layers on a trailing edge of the slider body, the deposition layers forming a plurality of elements on the trailing edge of the slider body, the plurality of elements including:
    a sensor element on the slider body and recessed from an air bearing surface of the slider body, the sensor element configured to provide an input detection signal responsive to spacing between the head and a data storage media;
    a read element separate from the sensor element;
    a microactuator element on the head configured to actuate a portion of the head towards the data storage media;
    detection circuitry configured to receive the input detection signal responsive to the spacing between the head and the data storage media and provide an output indicative of the head-media spacing; and
    control circuitry configured to provide a control input to the microactuator element to actuate the portion of the head to adjust the head-media spacing utilizing the output from the detection circuitry.

2. The assembly of claim 1 wherein the plurality of elements includes a write element.

3. The assembly of claim 1 wherein the sensor element includes a piezoelectric element.

4. The assembly of claim 3 wherein the piezoelectric element is coupled to one or both of the detection circuitry to provide the input detection signal responsive to the head-media spacing and the control circuitry to actuate the portion of the head to adjust the head-media spacing.

5. The assembly of claim 3 wherein the piezoelectric element is coupled to both of the detection circuitry to provide the input detection signal responsive to the head-media spacing and the control circuitry to actuate the portion of the head.

6. The assembly of claim 1 wherein the sensor element is a piezoelectric sensor and the microactuator element is a heater element.

7. The assembly of claim 1 wherein the sensor element is a piezoelectric sensor and the microactuator element is an electrostatic actuator.

8. The assembly of claim 1 wherein the head includes a plurality of bond pads electrically coupled to the read element and a plurality of bond pads electrically connected to the sensor element.

9. The assembly of claim 1 wherein the output from the detection circuitry is stored in memory accessible by the control circuitry.

10. The assembly of claim 1 wherein the microactuator element is a heater element.

11. The assembly of claim 1 wherein the slider body includes an air bearing surface between the leading edge and the trailing edge of the slider body and an upper surface opposite to the air bearing surface and the sensor element is encapsulated in an insulating material deposited over the sensor element.

12. The assembly of claim 1 wherein the plurality of elements includes a write element and the assembly includes a plurality of bond pads along the trailing edge of the slider body including at least one bond pad coupled to the sensor element to electrically connect the sensor element to the detection circuitry and at least one bond pad coupled to the microactuator element to electrically connect the microactuator element to the control circuitry and a plurality of bond pads coupled to the read and write elements.

13. An assembly comprising:
    a sensor element, comprising a piezoelectric material, on a slider body of a head located closer to a trailing edge of the slider body than a leading edge of the slider body and the sensor element configured to provide an input detection signal responsive to spacing between the head and a data storage media;
    a read element separate from the sensor element;
    a heater element on the head configured to protrude a portion of the head to adjust the head-media spacing between the head and the data storage media; detection circuitry coupled to the sensor element to receive the input detection signal responsive to the spacing between the head and the data storage media and provide an output responsive to the head-media spacing; and
    control circuitry coupled to the heater element and configured to provide a control input to the heater element to protrude the portion of the head utilizing the output from the detection circuitry.

14. The assembly of claim 13 wherein the sensor element and the heater element comprise a plurality of deposition layers along the trailing edge of the slider body.

15. The assembly of claim 13 wherein the head includes a write element and a plurality of bond pads to connect the read and write elements to drive circuitry and a plurality of bond pads to connect the sensor element to the detection circuitry and the heater element to the control circuitry.

16. The assembly of claim 13 wherein the head includes a write element on the head.

17. The assembly of claim 13 and further comprising a plurality of bond pads on the head including at least one bond pad electrically coupled to the sensor element and at least one bond pad electrically coupled to the heater element.

18. The assembly of claim 13 and comprising a protective portion deposited over the sensor element.

\* \* \* \* \*